(No Model.)

C. C. COLEMAN.
CANE PLANTING MACHINE.

No. 303,808. Patented Aug. 19, 1884.

WITNESSES:
Chas. Nicla.
C. Sedgwick

INVENTOR:
C. C. Coleman
BY Munn & Co
ATTORNEYS.

N. PETERS, Photo-Lithographer, Washington, D. C.

UNITED STATES PATENT OFFICE.

CHARLES CARSON COLEMAN, OF HONOLULU, OAHU, HAWAIIAN ISLANDS.

CANE-PLANTING MACHINE.

SPECIFICATION forming part of Letters Patent No. 303,808, dated August 19, 1884.

Application filed January 19, 1884. (No model.)

*To all whom it may concern:*

Be it known that I, CHARLES CARSON COLEMAN, of Honolulu, Oahu, Hawaiian Islands, have invented certain new and useful Improvements in Cane-Planting Machines, of which the following is a full, clear, and exact description.

Reference is to be had to the accompanying drawings, forming part of this specification, in which similar letters of reference indicate corresponding parts in all the figures.

Figure 1:
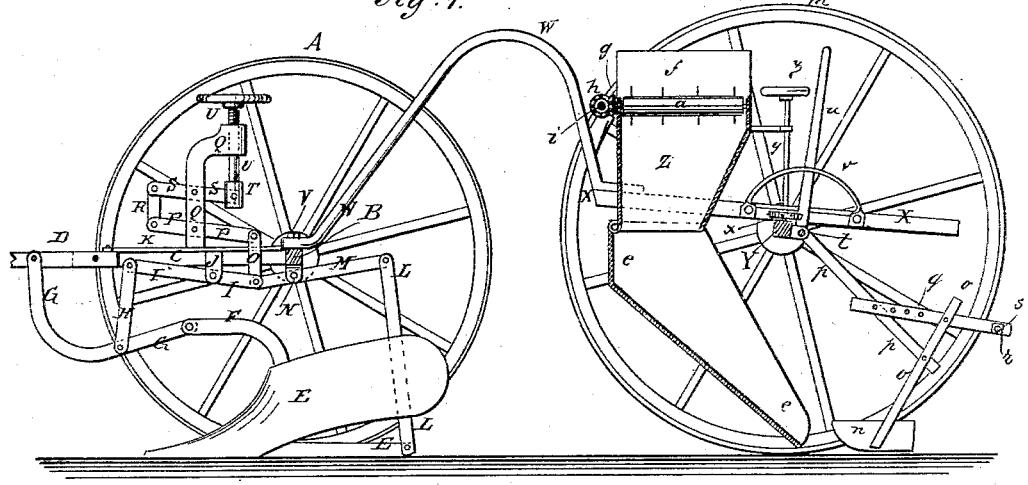
Figure 2:
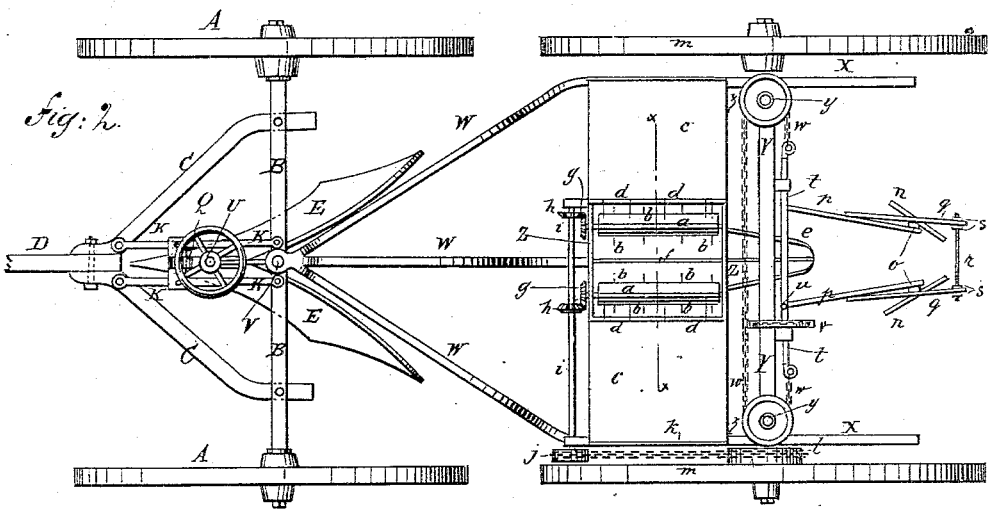
Figure 3:
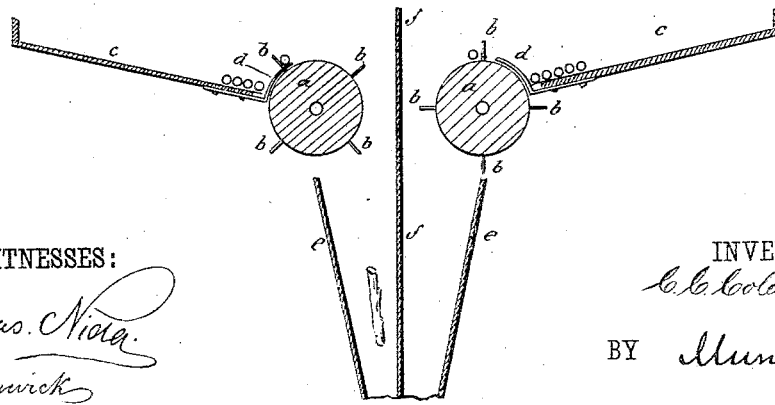

Figure 1 is a sectional side elevation of my improvement. Fig. 2 is a plan view of the same. Fig. 3 is a sectional elevation of the seed-dropping mechanism, taken through the line $x\ x$, Fig. 2, and in larger size, the roller-casing being removed.

The object of this invention is to improve the construction of the cane-planting machines for which Letters Patent No. 279,709 were issued to me June 19, 1883, in such a manner as to make them simpler in construction, more convenient in use, and more reliable in operation.

The invention consists in a cane-planting machine constructed with a furrowing-plow having a short curved beam and connected with a hand-screw by a series of levers and connecting-bars, so that the said plow can be readily raised and lowered. With the two spiked feed-rollers and their casing is connected a hinged spout, so that the said spout will adjust itself to the furrow. The feed-spout is divided into two compartments by a central partition, so that the seed from the rollers will be conducted separately to the ground. To the lower edge of the feed-table are attached guard-bars curved to fit against the feed-roller to support the pieces of seed-cane successively until removed by the spikes of the said feed-roller. The coverers are connected with the machine and each other by standards, bars, and adjustable braces, an adjustable connecting-rod, and a shaft provided with a lever, so that the said coverers can be readily adjusted and controlled. With the ends of the shaft carrying the coverers are connected the ends of a chain passing around chain-wheels attached to vertical shafts provided with hand-wheels, so that the said coverers can be readily adjusted laterally, as will be hereinafter fully described.

A represents the forward wheels, to the axle B of which are attached the hounds C of the tongue D.

E is a double mold-board plow to open a furrow to receive the seed. The beam F of the plow E is made short, and is curved forward, and to its forward end is pivoted the rear end of the lever G, which is curved upward, and is pivoted at its forward end to the lower side of the rear part of the tongue D, to support the draft-strain upon the plow.

To the lever G, a little in the rear of its center, is pivoted the lower end of a connecting-bar, H, the upper end of which is pivoted to the forward end of a lever, I, fulcrumed a little in the rear of its center to lugs J, formed upon or attached to the bars K. The forward ends of the bars K are attached to the forward ends of the hounds C, and their rear ends are attached to the middle part of the axle B.

To the rear end of the landside of the plow E is pivoted the lower end of the connecting-bar L, the upper end of which is pivoted to the rear end of the lever M. The lever M, a little in front of its center, is pivoted to lugs N, attached to or formed upon the lower side of the center of the axle B. The forward end of the lever M and the rear end of the lever I overlap each other, and are pivoted to the lower end of the short connecting-bar O, which passes up between the bars K, and is pivoted at its upper end to the rear end of the lever P. The lever P, a little in front of its center, is pivoted to the standard Q, and at its forward end is pivoted to the lower end of the short connecting-bar R, the upper end of which is pivoted to the forward end of the lever S. The lever S, at its middle part, is pivoted to the standard Q, and at its rear end is pivoted to a block, T, to which is swiveled the lower end of a hand-screw, U. The hand-screw U passes through a screw-hole in the rearwardly-projecting upper end of the standard Q, the lower end of which is attached to the bars K. With this construction, by turning the hand-screw U, the plow E can be adjusted to enter the ground to any desired depth, and can be raised above the ground for convenience in turning around and passing from place to place.

To the center of the axle B is pivoted, by the king-bolt V, the forward end of the reach W, which is made in three parts or branches, is arched to give the forward wheels a free movement in turning, and the rear ends of the branches are attached to a frame, X, rigidly secured to the rear axle, Y.

To the forward middle part of the frame X is attached a casing, Z, to the front and rear sides of which, or to other suitable supports, are journaled two rollers, $a$, placed at a little distance from each other and parallel with the length of the machine. Each roller $a$ is provided with four (more or less) rows of spikes, $b$, of sufficient length to take a piece of seed-cane from the lower edge of the inclined feed-table $c$, carry it over the said roller $a$, and drop it into the casing Z.

To the tables $c$, at their lower edges, are attached guard-bars $d$, the forward parts of which are curved to fit against the surfaces of the outer sides of the rollers $a$, to prevent the pieces of seed-cane from dropping down at the outer sides of the said rollers, while allowing them to come so close to the said rollers that they will be taken up successively by the spikes $b$. The guard-bars $d$ also prevent the roll from carrying the seed over before the spikes $b$ pick it up. The tables $c$ are supported from the frame X by standards or other suitable supports.

To the lower part of the casing Z is hinged a spout, $e$, which is tapered, inclined to the rearward, and extended downward, so that the lower end may follow along the furrow opened by the plow E and deposit the pieces of seed-cane in the said furrow. The spout $e$ may be so formed as to deposit the cane lengthwise with the furrow, or crosswise, as may be desired. The casing Z and spout $e$ are divided into two compartments by a partition, $f$, so that the pieces of seed-cane from the two rollers $a$ will pass separately to the ground. The two rollers $a$ may be arranged to drop the pieces of seed-cane at the same time or successively, so that the said pieces may be side by side, or may be lapped or placed end to end, as may be desired. The pieces of seed-cane can be supplied to the tables $c$ from a platform or a box attached to the frame of the machine.

To the forward journals of the rollers $a$ are attached beveled gear-wheels $g$, the teeth of which mesh into the teeth of the beveled gear-wheels $h$, attached to the shaft $i$. The shaft $i$ revolves in bearings in standards or other supports attached to the frame of the machine, and to its outer end is attached a small chain-wheel, $j$, around which passes an endless chain, $k$. The endless chain $k$ also passes around a chain-wheel, $l$, attached to the hub of one of the rear wheels, $m$, so that the seed-dropping rollers will be operated by the advance of the machine. The pieces of seed-cane are covered by the covering-plates $n$, which are attached to the standards $o$. The standards $o$ at a little distance from their upper ends are attached to the rear ends of the bars $p$, and are strengthened in position by the braces $q$, attached to their upper ends and to the bars $p$. Several holes are formed in the braces $q$, to receive the fastening-bolts, so that the pitch of the standards $o$ can be readily adjusted as may be desired. The rear ends of the braces $q$ project, and are connected by a rod, $r$, which has nuts $s$ screwed upon its ends, one upon each side of each of the braces $q$, so that the coverers can be readily adjusted at a greater or less distance apart by adjusting the said nuts $s$. The forward ends of the bars $p$ are rigidly attached to the shaft $t$, which rocks and slides in bearings attached to the axle Y.

To the shaft $t$ is rigidly attached the lower end of a lever, $u$, which projects upward across the arched catch-bar $v$, attached to the frame of the machine, so that lever $u$, and with it the coverers, will be held securely in any position in which they may be adjusted. By this construction the coverers can be readily adjusted to work at any desired depth in the ground, and can be raised above the ground for convenience in turning around and in passing from place to place.

To the ends of the shaft $t$ are attached the ends of a chain, $w$, which passes around chain-wheels $x$, attached to the lower parts of the vertical shafts $y$. The shafts $y$ are pivoted at their lower ends to bearings attached to the axle Y, and are held in upright positions by supports attached to the frame X or casing Z.

To the upper ends of the shafts $y$ are attached hand-wheels $z$, for convenience in turning the said shafts, and thus moving the shaft $t$ longitudinally and giving a lateral movement to the coverers to adjust them with relation to the furrow.

Having thus described my invention, what I claim as new, and desire to secure by Letters Patent, is—

1. In a cane-planting machine, the combination, with the furrowing-plow E, having a short curved beam, F, of the levers G I M P S, the connecting-bars H L O R, and the hand-screw U, substantially as herein shown and described, whereby the said furrowing-plow can be readily raised and lowered, as set forth.

2. In a cane-planting machine, the combination, with the two rollers $a$, having spikes $b$, and the casing Z, of the hinged spout $e$, substantially as herein shown and described, whereby the said spout can adjust itself to the furrow, as set forth.

3. In a cane-planting machine, the combination, with the two rollers $a$, having spikes $b$, the casing Z, and the spout $e$, of the partition $f$, substantially as herein shown and described, whereby the seed from the rollers will be conducted separately to the ground, as set forth.

4. In a cane-planting machine, the combination, with the inclined feed-table $c$ and the roller $a$, having spikes $b$, of the curved guard-bars $d$, substantially as herein shown and described, whereby the pieces of seed-cane will be successively supported until removed by the spikes of the feed-roller, as set forth.

5. In a cane-planting machine, the combination, with the feed-rollers $a$ and the spout $e$, of the coverers $n$, the standards $o$, the bars $p$, the adjustable braces $q$, the adjustable connecting-rod $r$, and the shaft and lever $t\ u$, substantially as herein shown and described, whereby the coverers can be readily adjusted and controlled, as set forth.

6. In a cane-planting machine, the combination, with the coverers $n$, the standards $o$, the bars $p$, the adjustable braces $q$, the adjustable connecting-rod $r$, and the shaft $t$, of the chain $w$, the chain-wheels $x$, the shafts $y$, and the hand-wheels $z$, substantially as herein shown and described, whereby the coverers can be readily adjusted laterally, as set forth.

CHARLES CARSON COLEMAN.

Witnesses:
JOSEPH E. WISEMAN,
WILLIAM J. WHITE.